(12) United States Patent
Byrne

(10) Patent No.: US 10,215,852 B1
(45) Date of Patent: Feb. 26, 2019

(54) ROBOTIC RADAR ASSISTANCE

(71) Applicant: Google LLC, Mountain View, CA (US)

(72) Inventor: Paul Vincent Byrne, Mountain View, CA (US)

(73) Assignee: Google LLC, Mountain View, CA (US)

( * ) Notice: Subject to any disclaimer, the term of this patent is extended or adjusted under 35 U.S.C. 154(b) by 676 days.

(21) Appl. No.: 14/875,020

(22) Filed: Oct. 5, 2015

(51) Int. Cl.
  *G06F 19/00* (2018.01)
  *G01S 13/88* (2006.01)
  *G01S 13/06* (2006.01)
  *B25J 9/16* (2006.01)

(52) U.S. Cl.
  CPC ........... *G01S 13/881* (2013.01); *B25J 9/1676* (2013.01); *B25J 9/1694* (2013.01); *G01S 13/06* (2013.01); *Y10S 901/09* (2013.01)

(58) Field of Classification Search
  None
  See application file for complete search history.

(56) References Cited

U.S. PATENT DOCUMENTS

| | | | |
|---|---|---|---|
| 5,247,306 A | 9/1993 | Hardange | |
| 5,448,479 A * | 9/1995 | Kemner | B62D 1/28 180/167 |
| 5,469,356 A * | 11/1995 | Hawkins | G01C 21/26 318/591 |
| 5,485,892 A * | 1/1996 | Fujita | B60K 28/066 180/167 |
| 5,586,030 A * | 12/1996 | Kemner | G05D 1/0257 340/909 |
| 5,991,474 A | 11/1999 | Baldi | |
| 6,923,080 B1 | 8/2005 | Dobler | |
| 7,499,774 B2 * | 3/2009 | Barrett | G05D 1/0061 340/426.11 |
| 7,499,775 B2 * | 3/2009 | Filippov | G05D 1/027 340/903 |
| 7,499,776 B2 * | 3/2009 | Allard | G05D 1/0061 701/1 |
| 7,499,804 B2 * | 3/2009 | Svendsen | G05D 1/027 340/426.11 |
| 7,511,654 B1 | 3/2009 | Goldman | |

(Continued)

FOREIGN PATENT DOCUMENTS

JP       2004326264 A   * 11/2004

OTHER PUBLICATIONS

Translation of JP 2004326264.*

(Continued)

*Primary Examiner* — Bhavesh V Amin
(74) *Attorney, Agent, or Firm* — McDonnell Boehnen Hulbert & Berghoff LLP

(57) ABSTRACT

Examples relate to implementing robotic radar assistance. A robotic device may use radar antennas coupled at different positions on the robotic device to monitor a buffer that extends proximate around one or more portions of the robotic device. In some instances, the buffer has a shape that corresponds to exterior shapes of the one or more portions of the robotic device. The robotic device may receive object location information from the radar antennas that indicates positions of respective objects within the buffer relative to the robotic device. Using the object location information, the robotic device may identify when an unexpected object enters within the buffer, and adjust robotic operation as a result.

20 Claims, 7 Drawing Sheets

(56) References Cited

U.S. PATENT DOCUMENTS

| | | | | |
|---|---|---|---|---|
| 7,742,841 B2* | 6/2010 | Sakai | | G05D 1/024 |
| | | | | 382/103 |
| 7,783,386 B2* | 8/2010 | Merte | | F16P 3/141 |
| | | | | 307/117 |
| 8,041,458 B2* | 10/2011 | Amino | | G01S 17/88 |
| | | | | 318/568.16 |
| 8,078,338 B2* | 12/2011 | Pack | | G05D 1/0061 |
| | | | | 701/1 |
| 8,315,735 B2* | 11/2012 | Nihei | | B25J 9/1676 |
| | | | | 318/568.11 |
| 8,571,722 B2* | 10/2013 | Samples | | G08G 1/168 |
| | | | | 701/1 |
| 8,676,379 B2* | 3/2014 | Okazaki | | B25J 9/1676 |
| | | | | 700/255 |
| 8,988,283 B2* | 3/2015 | Erad | | H01Q 21/29 |
| | | | | 342/432 |
| 9,098,753 B1* | 8/2015 | Zhu | | G06K 9/00805 |
| 9,110,471 B2* | 8/2015 | Pack | | G05D 1/0061 |
| 9,452,531 B2* | 9/2016 | Kikkeri | | B25J 9/1676 |
| 9,513,634 B2* | 12/2016 | Pack | | G05D 1/0061 |
| 9,607,226 B2* | 3/2017 | Zhu | | G06K 9/00805 |
| 2002/0184236 A1* | 12/2002 | Donath | | B60R 1/00 |
| 2003/0151541 A1* | 8/2003 | Oswald | | G01S 13/931 |
| | | | | 342/70 |
| 2004/0243529 A1* | 12/2004 | Stoneman | | G06N 99/005 |
| | | | | 706/10 |
| 2005/0149251 A1* | 7/2005 | Donath | | G01C 21/26 |
| | | | | 701/532 |
| 2005/0166413 A1* | 8/2005 | Crampton | | B25J 13/088 |
| | | | | 33/503 |
| 2006/0089763 A1* | 4/2006 | Barrett | | G05D 1/0061 |
| | | | | 701/23 |
| 2006/0089764 A1* | 4/2006 | Filippov | | G05D 1/027 |
| | | | | 701/23 |
| 2006/0089765 A1* | 4/2006 | Pack | | G05D 1/0061 |
| | | | | 701/23 |
| 2006/0089766 A1* | 4/2006 | Allard | | G05D 1/0061 |
| | | | | 701/23 |
| 2006/0089800 A1* | 4/2006 | Svendsen | | G05D 1/027 |
| | | | | 701/301 |
| 2008/0021597 A1* | 1/2008 | Merte | | F16P 3/141 |
| | | | | 700/255 |
| 2009/0069938 A1* | 3/2009 | Nishimura | | G05D 1/024 |
| | | | | 700/255 |
| 2009/0149990 A1* | 6/2009 | Myeong | | G05D 1/0274 |
| | | | | 700/245 |
| 2009/0198400 A1* | 8/2009 | Allard | | G05D 1/0061 |
| | | | | 701/23 |
| 2009/0219209 A1* | 9/2009 | Bush | | G01S 5/0257 |
| | | | | 342/450 |
| 2012/0101654 A1* | 4/2012 | Samples | | G08G 1/168 |
| | | | | 701/1 |
| 2012/0109423 A1* | 5/2012 | Pack | | G05D 1/0061 |
| | | | | 701/2 |
| 2013/0002489 A1* | 1/2013 | Erad | | G01S 3/20 |
| | | | | 342/432 |
| 2015/0310281 A1* | 10/2015 | Zhu | | G06K 9/00805 |
| | | | | 382/104 |

OTHER PUBLICATIONS

Kerpa, Development of a Flexible Tactile Sensor System for a Humanoid Robot, Oct. 2003, Institute of Process Control & Robotics, University of Karlsruhe, Germany.

* cited by examiner

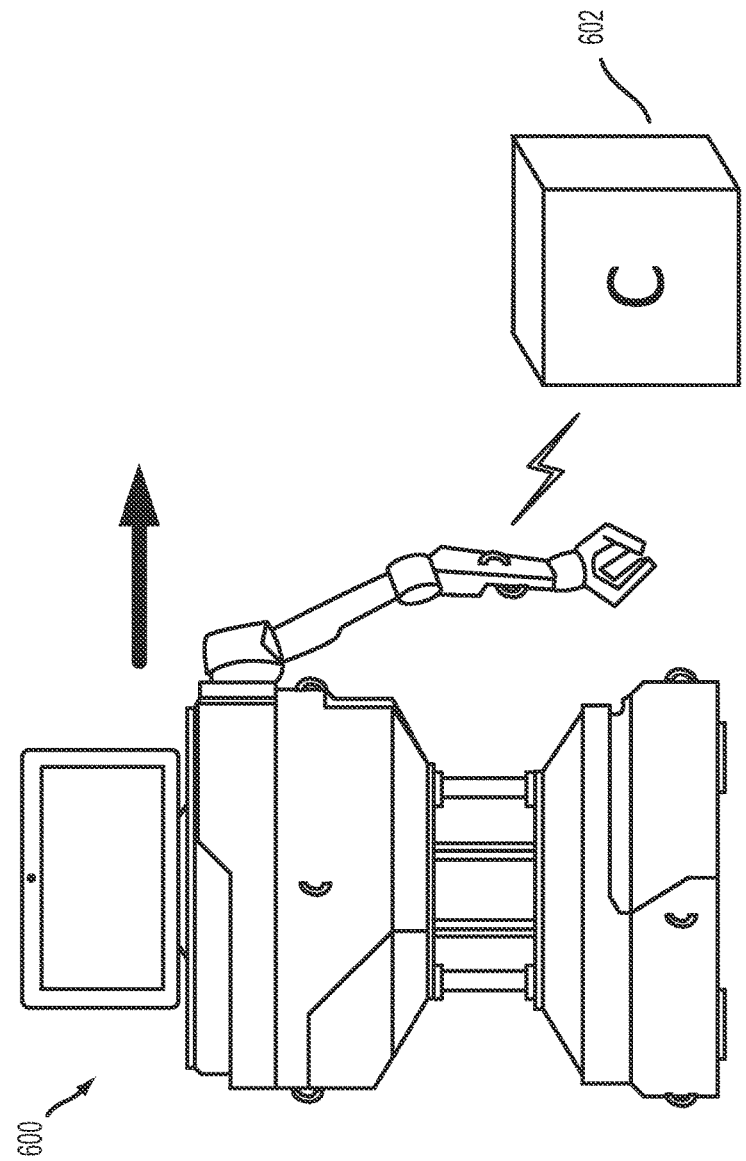

ROBOTIC RADAR ASSISTANCE

BACKGROUND

As technology advances, robotic devices are being created for performing a variety of functions that may assist users. For instance, robotic devices may be used for applications involving material handling, transportation, welding, assembly, and dispensing, among others. Over time, the manner in which these robotic systems operate is becoming more intelligent, efficient, and more intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly. Robotic systems are being expected to move and operate efficiently to perform new tasks and functions.

SUMMARY

Examples relate to implementing robotic radar assistance. A robotic device operating in an environment may perform a variety of different tasks. During the performance of a given task, the robotic device may execute operations more efficiently and accurately using robotic radar assistance, which may involve using one or more radar antennas connected at various portions of the robotic device to monitor a buffer (i.e., a volume of space) that extends around portions of the robotic device. The positioning and size of the radar antennas may vary within examples. For instance, in some implementations, the radar antennas may have a curved structure that extends a couple centimeters in length. In particular, the curve of the antenna may enable the antenna to monitor a curved buffer. Similarly, the radar antennas may be embedded within microchips or within other physical configurations. As such, a computing system associated with operating the robotic device may receive information from the radar antennas that informs the computing system when an object is detected within the buffer as well as other information corresponding to the detected object (e.g., location of the object relative to portion(s) of the robotic device, material of the detected object). Using the object location information provided by the radar unit, the computing system may identify when an unexpected object enters the buffer and adjust operation of the robotic device as a result. In some instances, the computing system may also use the object location information to assist in carrying out tasks that involve manipulating one or more expected objects.

In one aspect, a method is provided. The method may include monitoring, at a computing system using a plurality of radar antennas coupled at respective positions of a robotic device, a buffer that extends proximate around one or more portions of the robotic device. In some instances, the buffer has a shape that corresponds to exterior shapes of the one or more portions of the robotic device. The method may further include receiving object location information from the plurality of radar antennas. In some examples, the object location information indicates positions of respective objects within the buffer relative to the robotic device. The method may also include identifying, based on the object location information, an unexpected object within the buffer, and based on identifying the unexpected object within the buffer, causing the robotic device to adjust robotic operation.

In another aspect, a robotic device is provided. The robotic device may include one or more processors, and a non-transitory computer-readable medium, configured to store instructions, that when executed by the one or more processors, cause the one or more processors to perform functions. The functions may include monitoring, using a plurality of radar antennas coupled at respective positions of a robotic device, a buffer that extends proximate around one or more portions of the robotic device. In some instances, the buffer has a shape that corresponds to exterior shapes of the one or more portions of the robotic device. The functions may also include receiving object location information from the plurality of radar antennas. In some implementations, the object location information indicates positions of respective objects within the buffer relative to the robotic device. The functions may also include identifying, based on the object location information, an unexpected object within the buffer, and based on identifying the unexpected object within the buffer, causing the robotic device to adjust robotic operation.

In yet another aspect, a non-transitory computer-readable medium configured to store instructions, that when executed by one or more processors, cause a computing system to perform functions. The functions may include monitoring, using a plurality of radar antennas coupled at respective positions of a robotic device, a buffer that extends proximate around one or more portions of the robotic device. In some instances, the buffer has a shape that corresponds to exterior shapes of the one or more portions of the robotic device. The functions may also include receiving object location information from the plurality of radar antennas. In some implementations, the object location information indicates positions of respective objects within the buffer relative to the robotic device. The functions may also include identifying, based on the object location information, an unexpected object within the buffer, and based on identifying the unexpected object within the buffer, causing the robotic device to adjust robotic operation.

In still another example, a system is provided that comprises a means for monitoring, using a plurality of radar antennas coupled at respective positions of a robotic device, a buffer that extends proximate around one or more portions of the robotic device. In some instances, the buffer has a shape that corresponds to exterior shapes of the one or more portions of the robotic device. The system may also include means receiving object location information from the plurality of radar antennas. In some implementations, the object location information indicates positions of respective objects within the buffer relative to the robotic device. The system may also include means for identifying, based on the object location information, an unexpected object within the buffer, and based on identifying the unexpected object within the buffer, means for causing the robotic device to adjust robotic operation.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6A illustrates a robotic device using robotic radar assistance, according to an example implementation.

DETAILED DESCRIPTION

Figure 1:
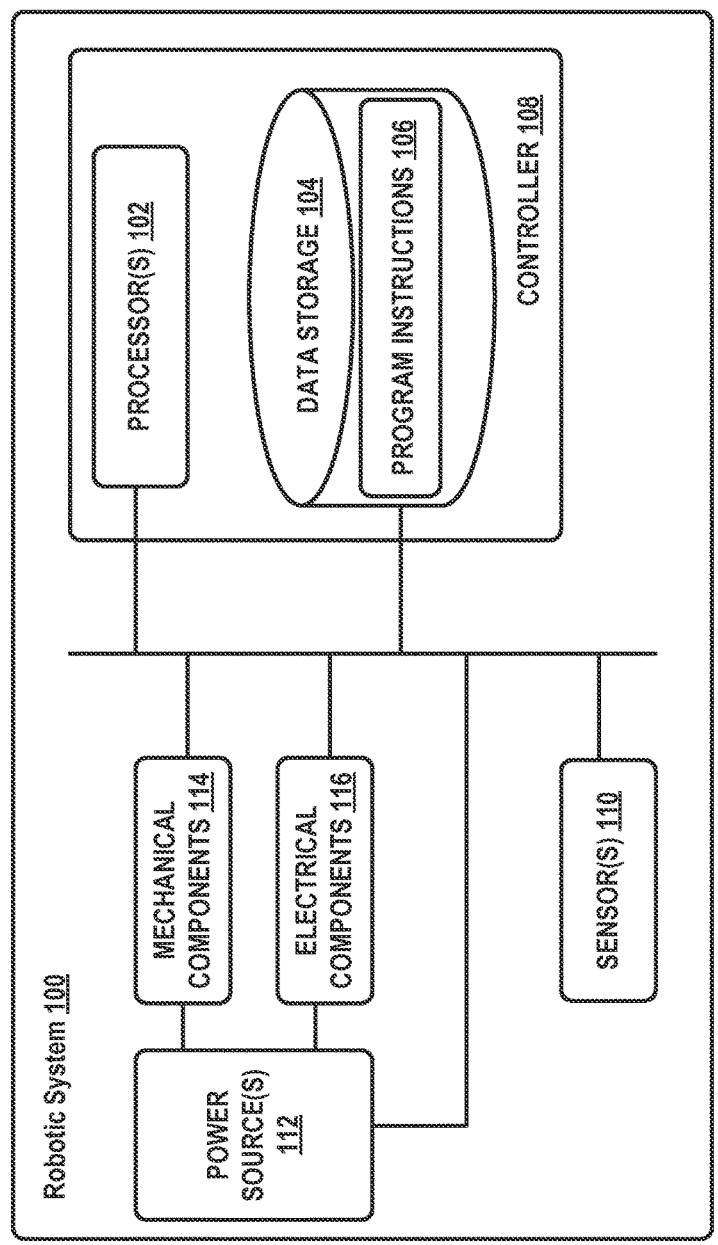
FIG. 1 shows an example block diagram of a robotic system.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Robotic devices are often used to complete tasks in a variety of settings, including manufacturing, retail, and household assistance. To improve the performance of robotic operations, a robotic device may utilize robotic radar assistance that involves a radar unit made up of one or more radar antennas coupled to portions of the robotic device monitoring one or more buffers (e.g., volumes of space) around portions of the robotic device. During the execution of robotic radar assistance, when an object enters the buffer, one or more of the radar antennas monitoring the buffer(s) can detect the object and measure object location information representing the presence and position of the object relative to the robotic device. As a result, a computing system assisting in controls of the robotic device may receive and utilize incoming object location information to identify when unexpected objects enter the buffer and adjust operations of the robotic device accordingly. For example, the computing system of a robotic device may identify an unexpected object entering in the robotic device's path of navigation and cause the robotic device to stop moving and/or change routes as a result. As indicated above and for other reasons, the execution of robotic radar assistance can enable a robotic device to improve operational efficiency and safety by maintaining a safe distance from other objects or people located in the environment of the robotic device.

Additionally, in some implementations, a robotic device may use robotic radar assistance to improve the performance of operations that involve manipulating objects in the environment of the robotic device (e.g., moving a nearby object). By way of an example implementation, the computing system of a robotic device may use object location information obtained by one or more radar antennas in order to continuously and/or incrementally adjust the path of a robotic arm to enable the manipulator positioned on the robotic arm to grip an expected object detected using the radar assistance.

In another example implementation of robotic radar assistance, a robotic device may receive and utilize measurements captured by a radar unit (e.g., various radar antennas coupled to the robotic device at numerous locations) in order to determine adjustments to execute as the robotic device operates. In particular, the radar antennas may monitor a buffer that extends proximate around different portions (e.g., entire robotic device or certain components) of the robotic device. For example, the arms of the robotic device may have one or more sets of radar antennas positioned in 120 degree increments configured to monitor a volume of space (i.e., a buffer) that extends completely around the arm. Similarly, other components of the robotic device may have connected radar antennas measuring for objects that may enter a position nearby the components.

Within implementations of robotic radar assistance, the shape and size of the radar antennas as well as other parameters of the radar unit (e.g., power levels) may vary within examples. For example, the body of the robotic device may have larger radar antennas compared to the smaller radar antennas positioned on the smaller components (e.g., legs, arms) of the robotic device. As such, the parameters of the utilized radar antennas (e.g., position, size) may vary within examples and changes in the parameters may enable the antennas to adjust the size and location of the buffers, for example.

Referring now to the figures, FIG. 1 shows an example block diagram of a robotic system 100. In particular, robotic system 100 represents an example configuration of a robotic system configured to perform operations described herein and may exist in various forms, such as a humanoid robot or quadruped robot, among other examples. As such, robotic system 100 may be configured operate autonomously, semi-autonomously, and/or through user control enabled through various interfaces, and may other configurations, which may include more or less components than the components shown in FIG. 1.

In the implementation illustrated in FIG. 1, robotic system 100 includes processor(s) 102, data storage 104, program instructions 106, controller 108, sensor(s) 110, power source(s) 112, mechanical components 114, and electrical components 116. These various components may be connected in any manner, including wired or wireless connections, etc., and/or may be positioned on multiple entities rather on a single entity. For example, a separate computing system (e.g., a safety server) may control one or more operations of robotic system 100 through wireless communication.

Processor(s) 102 may include one or more general-purpose processor(s) or special purpose processor(s) (e.g., digital signal processors, application specific integrated circuits, etc.), which execute computer-readable program instructions 106 that are stored in data storage 104. During operation, processor(s) 102 may execute programs or processes as a result of receiving inputs, such as sensor data (e.g., object location information) from sensors 110. In addition, processor(s) 102 may provide instructions to one or more systems of robotic system 100 to perform operations.

Data storage 104 may correspond to any one or more of various types of storage configured to hold memory. For example, the data storage 104 may include or take the form of one or more non-transitory computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 may be a single physical device (e.g., one optical, magnetic, organic or other memory or disc storage unit). Similarly, the data storage 104 can be implemented using two or more physical devices, which may communicate via wired or wireless communication. Further, in addition to the non-transitory computer-readable program instructions 106, the data storage 104 may include additional data such as diagnostic data, among other possibilities.

In addition, robotic system 100 may include one or more controllers (e.g., controller 108) that may perform operations. Controller 108 may operate according to processor(s) 102, data storage 104, and computer-readable program instructions 106. Other examples of controllers may be used.

Robotic system 100 further includes sensor(s) 110. In some implementations, sensor(s) 110 may include, but is not limited to force sensors, proximity sensors, motion sensors, load sensors, position sensors, touch sensors, depth sensors, ultrasonic range sensors, and/or infrared sensors, among other possibilities. During operation, sensor(s) 110 may provide sensor data to the processor(s) 102 and/or other computing systems associated with robotic system 100 to allow for appropriate interaction of robotic system 100 with the environment, as well as monitoring robotic system 100. The sensor data may be used in evaluation of various factors for activation and deactivation of mechanical components 114 and electrical components 116.

In some instances, sensor(s) 110 may provide information indicative of the environment of the robotic device for the controller 108 and/or computing system to use to determine operations for robotic system 100. For example, sensor(s) 110 may capture data corresponding to the terrain of the environment or location of nearby objects, which may assist with environment recognition and navigation, etc. In one example configuration, robotic system 100 may include a sensor system that includes RADAR, LIDAR, a global positioning system (GPS), and/or other sensors for capturing information regarding the environment of robotic system 100. Sensor(s) 110 may monitor the environment in real-time and detect obstacles, elements of the terrain, weather conditions, temperature, and/or other parameters of the environment for robotic system 100.

Further, robotic system 100 may include other sensor(s) 110 configured to receive information indicative of the state of various components of robotic system 300. For instance, sensor(s) 110 may measure activity of systems of robotic system 300 and receive information based on the operation of the various features of robotic system 100, such the operation of extendable legs, arms, or other mechanical components 114 and/or electrical components 116 of robotic system 100. The sensor data provided by the sensors may enable the controller 108 to determine errors in operation as well as monitor overall functioning of components of robotic system 100. For example, the controller 308 may use sensor data to determine a stability of robotic system 100 during operations, e.g., walking, running, etc., as well as measurements related to power levels, communication activities, and components that may require repair or resetting, among other information.

As one example configuration, robotic system 100 may include gyroscope(s), accelerometer(s), and/or other possible sensors to provide sensor data. As such, the gyroscope(s) may measure an orientation of robotic system 100 and the accelerometer(s) may measure proper acceleration of robotic system 300. Further, sensor(s) 110 may also monitor the current state of a function, such as a gait of robotic system 300.

Sensor(s) 110 may include various types of radar units, such as radar antennas coupled to portions of the robotic device at various locations. The radar antennas may have various sizes and shapes (e.g., curved, straight), including miniature radar antennas that exist a few millimeters to a few inches in size, for example. In some instances, the size and/or shape of the radar antennas may impact the buffer that the radar antennas monitor. For instance, curved radar antennas may monitor buffers of space that curve around one or more portions of a robotic device. In some implementations, robotic system 100 may include one or more radar antennas positioned to the body, head, chest, back, sides, arms, legs, and/or other portions of robotic system 100. The radar antennas may provide object location information (e.g., detect positions of nearby objects) to a computing system, processor(s) 102, and/or other components of robotic system 100.

Additionally, robotic system 100 may also include one or more power source(s) 112 configured to supply power to various components of robotic system 100. Among possible power systems, robotic system 100 may include a hydraulic system, pneumatic system, electrical system, batteries, a gasoline engine, and/or other types of power systems. As an example, robotic system 100 may include one or more batteries configured to provide charge to components via a wired and/or wireless connection. In some instances, components of the mechanical components 114 and electrical components 116 may each connect to a different power source or may be powered by the same power source. Other components of robotic system 100 may connect to power source(s) 112 in various ways as well. The power source(s) 112 may charge using various types of charging technology, such as wired connections to an outside power source, wireless charging, combustion, or other examples.

Mechanical components 114 represent hardware of robotic system 100 that may enable robotic system 100 to operate and perform physical tasks. As a few examples, robotic system 100 may include actuator(s), extendable leg(s) ("legs"), arm(s), wheel(s), one or multiple structured bodies for housing the computing system or other components, and other mechanical components. Mechanical components 114 may depend on the design of robotic system 100 and may also be based on the functions and/or tasks robotic system 100 may be configured to perform. In some examples, robotic system 100 may be configured to add and/or remove mechanical components 114, which may involve assistance from a user and/or other robotic device. For example, robotic system 100 may be initially configured with four legs, but may altered by a user or robotic system 100 to remove two of the four legs to operate as a biped.

In some implementations, one or more mechanical components 114 may include one or more radar antennas coupled at various positions. For instance, one or more arms of robotic system 100 may include three millimeter-tall radar antennas positioned at 120 degree increments to enable object detection of objects entering a position nearby the arms at any position proximate to the arm. Similarly, the one or more arms and/or other components may include 6 radar antennas positioned at 60 degree increments around the components. In some instances, the radar antennas may not have uniform increments and may have positions that depend on locations of the robotic device that engage objects more often, for example. Other layouts of the radar antennas may be used within examples.

Electrical components 116 may include various components capable of processing, transferring, providing electrical charge or electric signals, for example. Among possible examples, electrical components 116 may include electrical wires, circuitry, and/or wireless communication transmitters and receivers to enable operations of robotic system 100. Electrical components 116 may interwork with mechanical components 114 to enable robotic system 100 to perform various operations. Electrical components 116 may be configured to provide power from the power source(s) 112 to the various mechanical components 114, for example. Other examples of electrical components 116 may exist as well.

Figure 2:
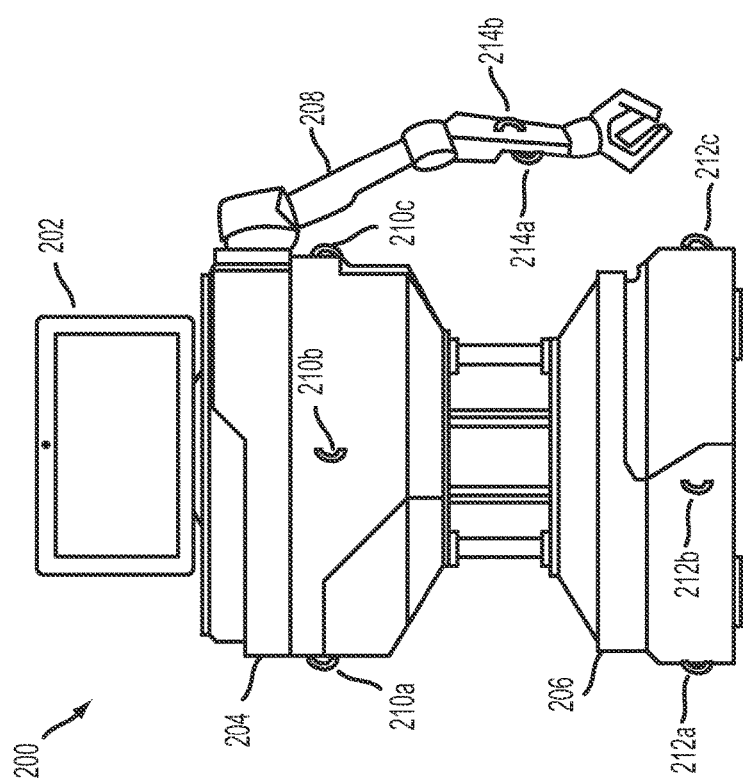
FIG. 2 depicts a graphical illustration of a robotic device, according to an example implementation.

FIG. 2 depicts a graphical illustration of a robotic device, according to an example implementation. Robotic device 200 is shown having an on-board computing system (e.g., device 202), body 204, base 206, and mechanical actuator 208. In addition, robotic device 200 includes radar antennas coupled to components at various locations, including radar antenna 210*a*, radar antenna 210*b*, radar antenna 210*c* coupled to portions of body 204, radar antenna 212*a*, radar antenna 212*b*, radar antenna 212*c* coupled to base 206, and radar antenna 214*a*, radar antennas 214*b* coupled to mechanical actuator 208. As such, robotic device 200 serves as one possible illustration of a robotic system 100, but may correspond to other robotic systems in other implementations, and may have other configurations within examples.

Example robotic devices, such as robotic device 200 may be configured to operate according to a robot operating system (e.g., an operating system designed for specific functions of the robot), which may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

Additionally, in some implementations, robotic device 200 may operate using assistance from one or more computing systems, such as device 202. For instance, a computing system may control one or more operations of robotic device 200 and may be a laptop computer, smart phone, and/or other types of computing systems. Device 202 may correspond to a computing system built into robotic device 200 in other implementations. In some implementations, robotic device 200 may be configured to access and communicate with other devices and/or cloud servers, for example. Robotic device 200 may use a wired link, such as a parallel bus or a serial bus such as a Universal Serial Bus (USB), or a wireless link, such as Bluetooth, IEEE 802.11, Cellular (such as GSM, CDMA, UMTS, EV-DO, WiMAX, or LTE), or Zigbee, among other possibilities.

As shown, robotic device 200 includes body 204, base 206, and mechanical actuator 208 (e.g., robotic arm), but may include more or less components, such as additional mechanical actuators. Body 204 is shown having radar antennas 210*a*-210*c* coupled at different locations, but may include more antennas (not shown), such as radar antennas positioned on sides of the body now shown in FIG. 2. As such, radar antennas 210*a*-210*c* as well as other radar antennas coupled to body 204 and/or nearby body 204 may enable object location measurement of objects entering a buffer extending proximate to body 204. In an example implementation, radar antenna 210*a* and radar antenna 210*c* may enable monitoring of a curved buffer extending nearby the sides of body 204 and radar antenna 210*b* may enable monitoring of a buffer extending nearby the front of body 204. Similarly, the radar antennas may monitor a buffer having a different shape or size within examples.

Likewise, base 206 is shown having radar antennas 212*a*-212*c* coupled to the different sides of base 206, but may have more radar antennas (not shown). As such, radar antennas 212*a*-212*c* may enable object location measurement of objects entering a buffer extending proximate to base 206. The buffer may extend straight or curve in examples. For example, body 206 is shown having a curved exterior shape so radar antennas 212*a*-212*c* may monitor a buffer that is curved in a manner similar to the curved exterior shape of body 206. In other examples, the buffer may have different shapes that may depend on parameters associated with radar antennas 212*a*-212*c*.

Mechanical actuator 208 illustrates an example positioning of radar antennas, such as radar antennas 214*a*-214*b*, coupled near a middle portion of mechanical actuator 208. Similar to the other radar antennas, radar antennas 214*a*-214*b* may assist in developing a buffer (e.g., a volume of space) around all or a portion of mechanical actuator 208 that enables the detection of objects when an object enters into the buffer positioned nearby mechanical actuator 208. During operation, radar antennas 214*a*-214*b* may measure a location and/or other features of an object that enters nearby mechanical actuator 208 and relay the measurements to a computing system associated with operating robotic device 200 (e.g., device 202). In other implementations of robotic device 200, one or more portions of robotic device 200 may include more or less antennas having various configurations and positions configured to enable measurement of objects when the objects are located nearby robotic device 200.

Figure 3:
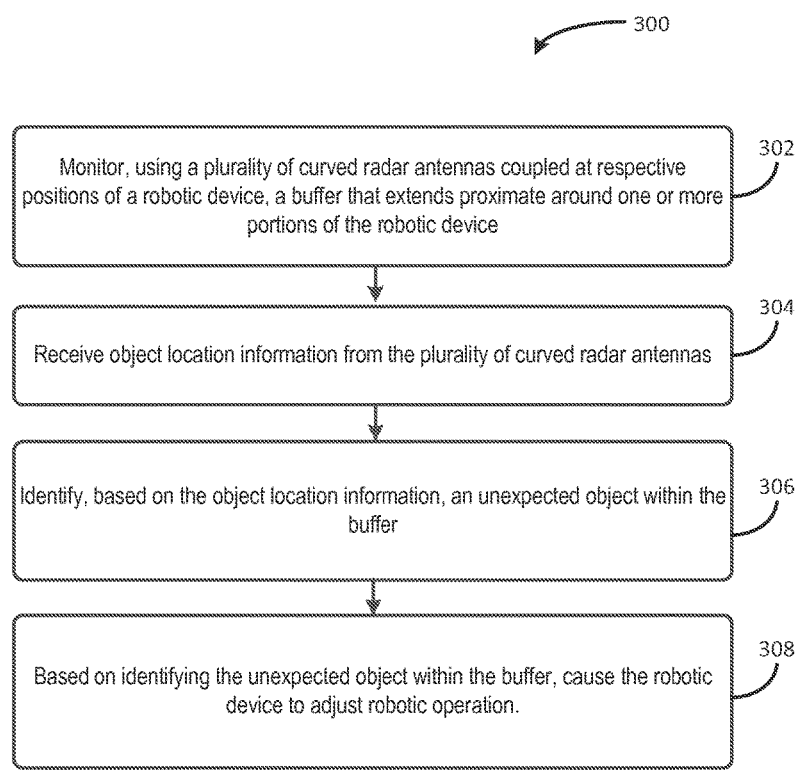
FIG. 3 is a flowchart for performing robotic radar assistance, according to an example implementation.

FIG. 3 is a flowchart for performing robotic radar assistance, according to an example implementation. Method 300 may include one or more operations, functions, or actions as illustrated by one or more blocks 302-308. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

Moreover, the computer readable medium may include a non-transitory computer readable medium, for example, such as computer-readable media that stores data for short periods of time like register memory, processor cache and Random Access Memory (RAM). In some instances, the computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process. Example methods, such as method 300 of FIG. 3 may be carried out in whole or in part by a system (e.g., robotic system 100) and/or multiple systems. Accordingly, example methods could be described by way of example herein as being implemented by a server, a computing system, or a network of computing systems. However, it should be understood that an example method may be implemented in whole or in part by other computing devices or separate from the computing system. For example, an example method may be implemented in whole or in part by a server system, which receives data from a device such as those associated with a given robotic device.

At block 302, method 300 may include monitoring, using a plurality of radar antennas coupled at respective positions of a robotic device, a buffer that extends proximate around one or more portions of the robotic device. For example, robotic device 200 shown in FIG. 2 may have one or more radar antennas (e.g., radar antennas 210a-210c, radar antennas 212a-212c, and radar antennas 214a-214b) coupled to portions of robotic device 200 that are configured to monitor one or more buffers around one or more portions of robotic device 200. The buffer(s) may represent an area and/or volume extending around one or more portions of the robotic device that the radar antennas monitor for expected and unexpected objects. As such, the robotic device may perform operations while maintaining a safe distance from other objects or people located in the environment of the robotic device.

In some implementations, a robotic device may have a radar unit (e.g., one or more radar antennas) that monitors a buffer or buffers (i.e., volume of space) existing around one or more portions of the robotic device and measure information (e.g., object location information) about detected objects that enter into a given buffer for a computing system associated with the robotic device to process. In some examples, the object location information gathered by the radar unit further includes measurements that indicate a position of a detected object relative to one or more portions of the robotic device. Similarly, the radar antennas and/or other sensors may provide object location information that indicates other parameters of the detected object, such as the color, material (e.g., soft, hard), size, shape, and/or other characteristics of the detected object.

Figure 4:
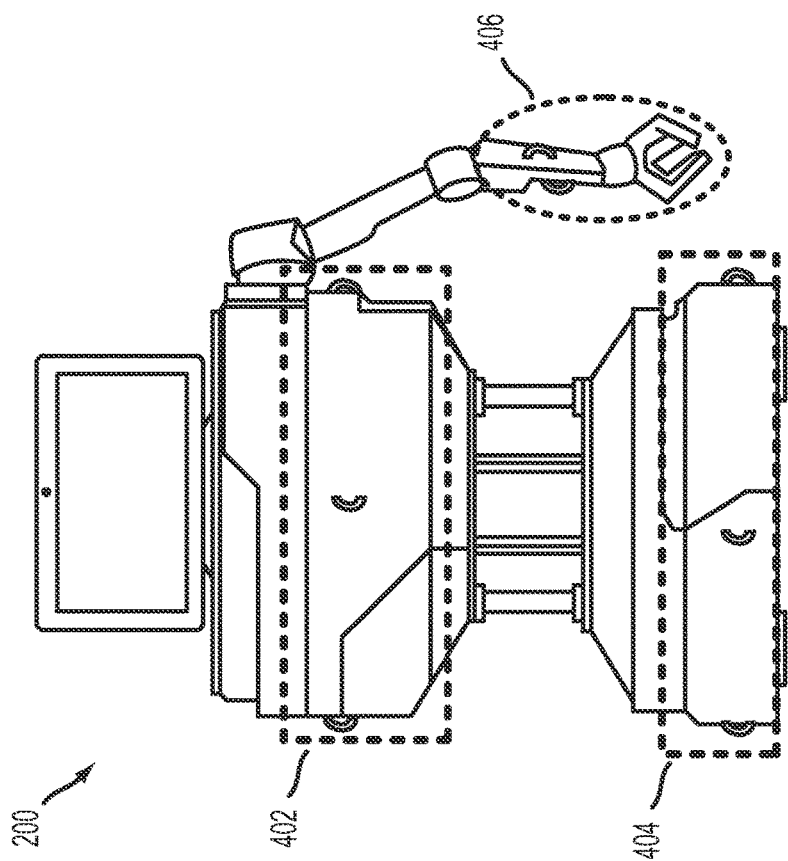
FIG. 4 depicts a graphical illustration of a robotic device using radar assistance, according to an example implementation.

In some implementations, the radar antennas coupled to a robotic device may monitor a volume or area of space (i.e., a buffer) that has a shape that corresponds to the exterior shapes of the one or more underlying portions of the robotic device. For example, FIG. 4 depicts a graphical illustration of robotic device 200 using radar assistance, according to an example implementation. In particular, robotic device 200 described in FIG. 2 is shown having radar antennas measuring and monitoring buffer 402, buffer 404, and buffer 406 in FIG. 4.

As shown in FIG. 4, buffers 402-406 may have different shapes and positions that depend on the underlying radar antennas and/or sensors performing the object location measurements. For instance, buffer 406 is shown having an ellipsoid shape, but may have other shapes within other implementations. In addition, a computing system may have the ability to cause the radar antennas and/or sensors to adjust the shape, size, and/or other parameters of one or more buffers used for detecting nearby objects. For example, the computing system may cause the radar antennas to detect objects that enter into a buffer that extends farther from one or more portions of the robotic device.

In other implementations, one or more radar antennas and/or other sensors associated with robotic device 200 may develop and detect objects entering into more or less buffers formed proximate to portions of robotic device 200, which may include combining and/or adjusting the sizes of buffers 402-406. For example, in another implementation, radar antennas coupled to robotic device 200 may detect objects entering into a buffer that extends proximate to and around all portions of robotic device 200.

Within implementations, the radar antennas may be configured to manipulate the position and other parameters (e.g., shape, size) of the buffers. For instance, in some instances, the radar antennas may create a two-dimensional (2D) buffer that extends around one or more portions of the robotic device. As a result, the radar antennas and/or another sensor may relay object detection information when an object enters the plane of the 2D buffer. A computing system may provide instructions to the radar antennas to extend the 2D buffer closer or farther away from the portions of the robotic device. Additionally or alternatively, in some implementations, the radar antennas may monitor a volume of space (e.g., a buffer) that includes one or more portions of the robotic device. As an example, radar antennas 210a-210c measuring the virtual buffer 402 may adjust power settings and/or other parameters to increase or decrease the size of virtual buffer 402 around body 204 of robotic device 200. In some examples, the radar antennas may exist as embedded in radar chips that couple to portions of the robotic device.

A robotic device may include one or more radar antennas that couple to the robotic device at various locations (e.g., body, head, arms, etc.). In some implementations, each radar antenna may have a different physical structure (e.g., curved, rectangular, embedded within microchips) that enables the creation of a buffer around a portion or portions of a robotic device for measuring object location information for objects entering within the buffer. For example, the structure and/or positioning of a given radar antenna may depend on shape of the buffer and/or shape of the portion of the robotic device that the given radar antenna is configured to monitor. Additionally, in some example implementations, the radar antennas may operate on one or more Wi-Fi frequencies. For example, radar antennas may operate according to IEEE 802.11 standards. The radar antennas may communicate on a wireless communication channel separate from other devices and/or other types of wireless communication.

Referring back to FIG. 3, at block 304, method 300 may include receiving object location information from the plurality of radar antennas. As a robotic device operates, the radar antennas and/or other sensors associated with the robotic device may measure object location information for objects detected proximate to the robotic device (e.g., entering a buffer positioned around one or more portions of the robotic device) and relay the measurements to one or more computing systems, such as a computing system controlling operations of the robotic device and/or a safety computing system associated with monitoring operation of one or more robotic devices within an environment. As indicated above, the object location information measured by the radar antennas and/or other sensors may include various information corresponding to an object detected proximate to the robotic device, such as the position of the detected object relative to one or more portions of the robotic device as well as other characteristics of the detected object (e.g., size, material). In some instances, the radar antennas and/or other sensors may measure movement characteristics of the detected object. For example, the radar antennas may provide information indicating whether an object is moving or stationary, the acceleration and velocity of the object relative to the robotic device, etc. Similarly, the radar antennas may measure whether an object is soft or hard, for instance. In some instances, the curve or general structure of a radar antenna may impact the buffer that the radar antennas are able to measure.

Figure 5:
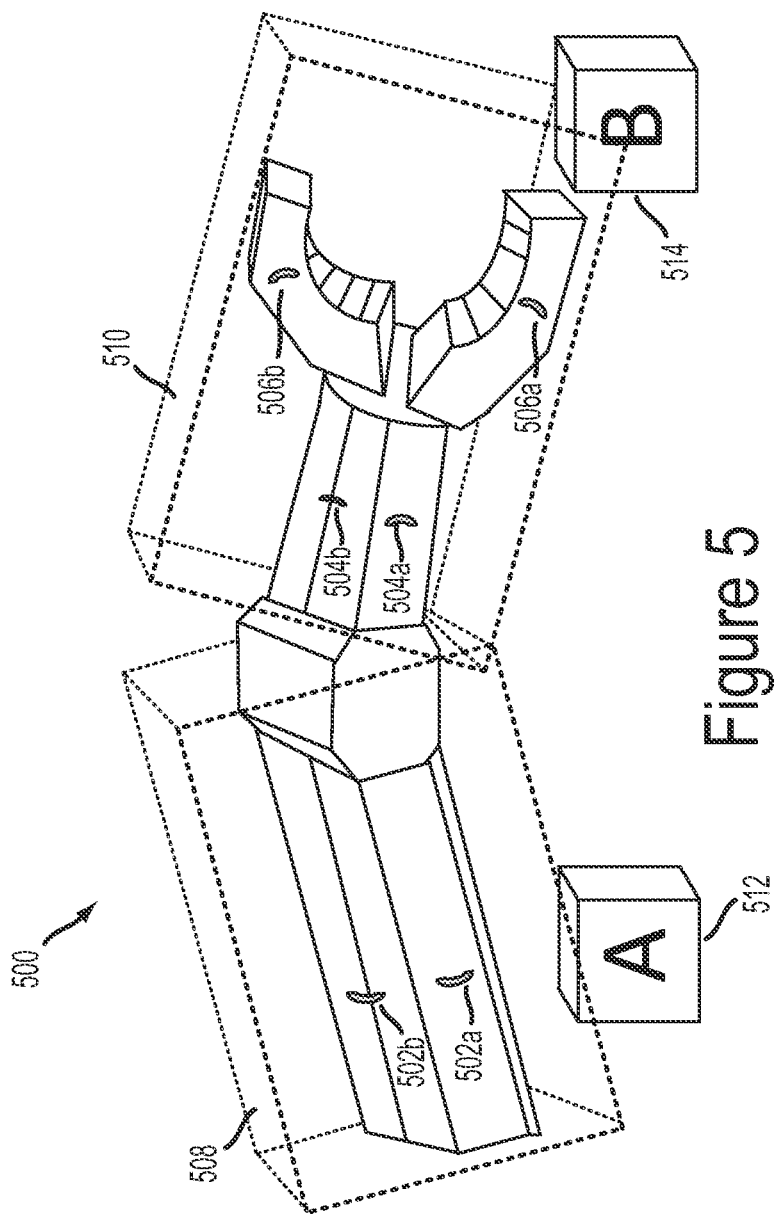
FIG. 5 depicts a graphical illustration of a robotic component implementing radar assistance.

By way of an example, FIG. 5 depicts a graphical illustration of a robotic component implementing radar assistance. In particular, robotic arm 500 represents a robotic component that has multiple radar antennas (i.e., radar antenna 502a, radar antenna 502b, radar antenna 504a, radar antenna 504b, radar antenna 506a, radar antenna 506 arranged in an example configuration monitoring for objects (e.g., object "A" 512, and object "B" 514) that may move into a position nearby robotic arm 500 (e.g., buffer 508, buffer 510).

In the illustrated implementation, robotic antennas 502a-502b correspond to a first set of radar antennas configured to enable the measurement of objects (e.g., entering into buffer 508 positioned around an upper portion of robotic arm 500 and robotic antennas 504a-504b and robotic antennas 506a-506b create a second set of radar antennas configured to enable the measurement of objects entering into buffer 510 positioned around a lower portion of robotic arm 400. It is important to note that robotic arm 500 may include additional radar antennas having various shapes or sizes positioned at different locations of robotic arm 500, such as the sides of robotic arm 500 not shown in FIG. 5.

As shown in FIG. 5, one or more radar antennas (e.g., radar antenna 502a) may detect the presence of object "A" 512 in buffer 508 positioned nearby the upper portion of robotic arm 500. In some instances, object "A" 512 may represent an unexpected or expected object (e.g., a vehicle, object, or person) that moved into a location proximate to the upper arm of robotic arm 500. Similarly, the radar antennas (e.g., radar antenna 502a, radar antenna 502b) may detect the presence of object "A" 512 as a result of the robotic device moving robotic arm 500 during the performance of an operation.

Additionally, one or more radar antennas (e.g., radar antennas 504a-50b, radar antennas 506a-506b) may detect the presence of object "B" 514 located proximate to the manipulator positioned on the end of robotic arm 500. In an example implementation, object "B" 514 may represent an expected object that robotic arm 500 is attempting to grab and/or perform another operation with. As such, the robotic device may use object location information received from radar antennas detecting object "B" 514 in buffer 510 to enhance the accuracy of performing the operation by the robotic device (e.g., grabbing object "B" 514).

Referring back to method 300, at block 306, method 300 may include identifying, based on the object location information, an unexpected object within the buffer. The computing system may process object location information provided by the radar unit (e.g., one or more radar antennas) to identify objects that may enter within the buffer (i.e., objects that have a location proximate to one or more portions of the robotic device). In some instances, the computing system may determine that a detected object corresponds to an unexpected object. In some examples, an unexpected object is an object that has not been previously identified by other sensors (e.g., depth, visual sensors) associated with the robotic device.

By way of example, FIG. 6A illustrates a robotic device using robotic radar assistance, according to an example implementation. Robotic device 600 is shown using robotic radar assistance to detect the presence of object "C" 602 proximate to a portion (e.g., robotic arm) of robotic device 600. In particular, one or more radar antennas positioned on the robotic arm of robotic device 600 is shown detecting object "C" 602 during navigation of robotic device 600. A computing system associated with robotic device 600 may analyze the object location information corresponding to object "C" 602 to determine if object "C" 602 corresponds to an unexpected object. In other example illustrations, other radar antennas and/or sensors may detect the presence of object "C" 602 as robotic device 600 operates.

In some implementations, a robotic device may use radar assistance to determine when an object is in a location proximate to one or more portions of the robotic device without relying on measuring a particular buffer area. As such, the robotic device may continuously monitor objects that have move into a location proximate to one or more portions of the robotic device.

At block 308, method 300 may include, based on identifying the unexpected object within the buffer, causing the robotic device to adjust robotic operation. The computing system of the robotic device may cause the robotic device to operate differently as a result of detecting an unexpected object within the buffer. For example, the computing system may cause the robotic device to stop the current operation, adjust one or more motions associated with the current operation, and/or change the current operation. Similarly, the computing system may cause the robotic device to perform other actions as a result of identifying a nearby unexpected object. For instance, the computing system may change robotic operation based on the type of object that was detected.

In an example implementation, the computing system may cause the robotic device to stop operating until detecting that the unexpected object is no longer positioned in the buffer. This may prevent a collision between the robotic device and the unexpected object. In some instances, the computing system may gather additional information from one or more sensors while the robotic device is stopped in order to determine a subsequent operation for the robotic device to perform.

Figure 6B:
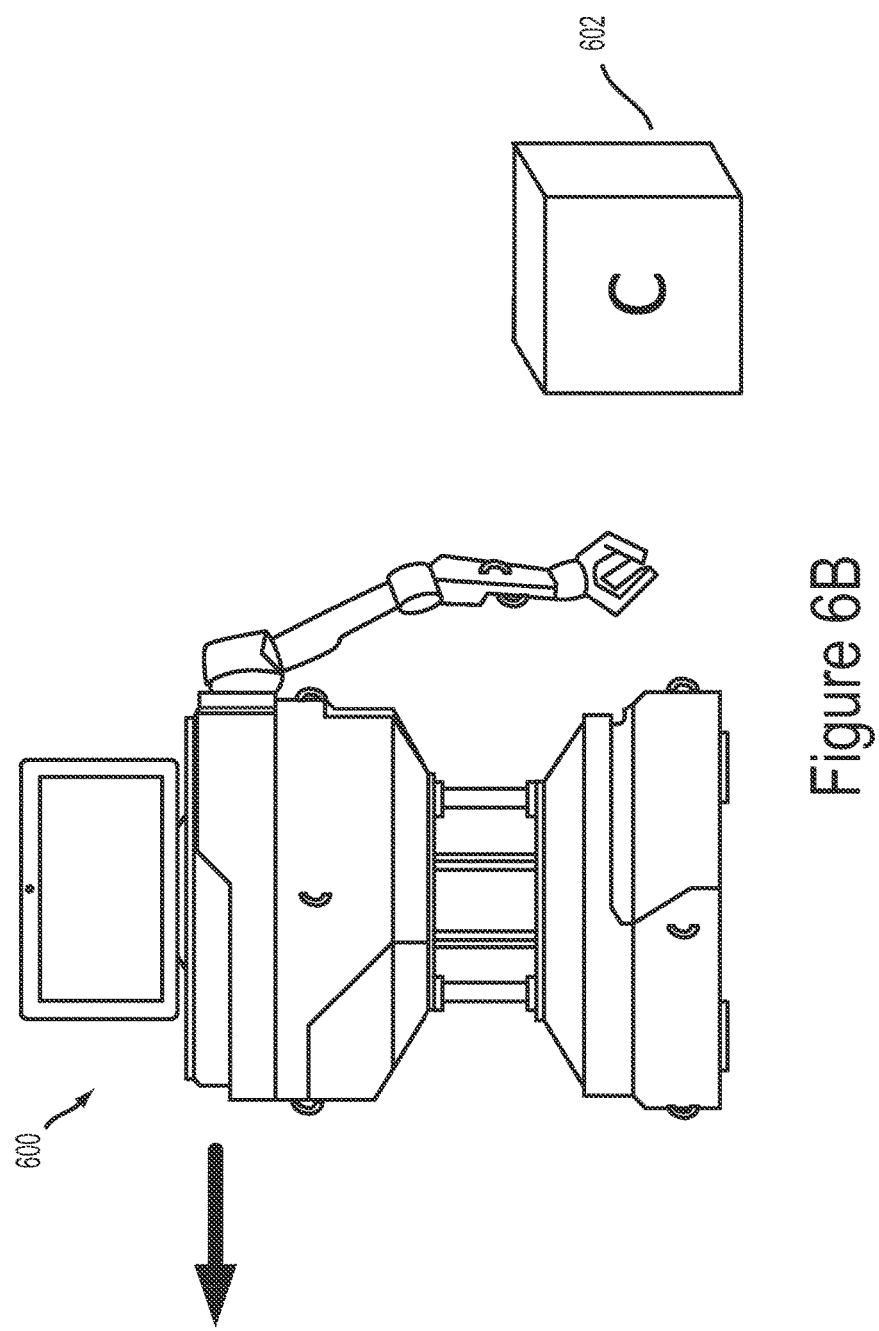
FIG. 6B illustrates the robotic device of FIG. 6A adjusting robotic operation after using robotic radar assistance, according to an example implementation.

By way of an example implementation, FIG. 6B illustrates the robotic device of FIG. 6A adjusting robotic operation after using robotic radar assistance. In particular, robotic device 600 is shown changing a path of navigation as a result of receiving object location information detecting the presence of unexpected object "C" 602 through the use of radar assistance. In other instances, a computing system and/or safety server may cause robotic device 600 to stop moving and/or perform a different operation responsive to detecting presence of unexpected object "C" 602. Similarly, in some instances, the computing system may gather additional data directed towards the detected object "C" 602 and/or perform other operations. For example, the computing system may utilize cameras and/or other sensors to further analyze object "C" 602 to determine one or more subsequent operations for the robotic device to perform. In other instances, robotic device 600 may stop performing a current operation as a result of detecting object "C" 602, for example.

In an example implementation, a computing system may cause one or more radar antennas to analyze the presence of nearby objects using layered buffers. For example, an outermost buffer extending farther out than other buffers from one or more portions of the robotic device may be used by the radar antenna to simply detect the presence of objects without gathering additional information about the objects. However, when an object enters a position closer to a portion of the robotic device (i.e., in a buffer positioned proximate to portion of the robotic device), the radar antennas may be configured to send more urgent signals to the computing system and/or gather additional object location information regarding the detected object (e.g., size, velocity, acceleration of the object). Other uses of layered buffers may be utilized within examples.

In some implementations, during operation, a robotic device may receive instructions to perform some tasks that may result in expected objects entering within the buffer. For example, the robotic device may perform operations relating to gripping an object or objects that requires the robotic device to manipulate object(s) that enter the buffer. As such, the robotic device may continue to carry out the tasks despite the expected objects entering the buffer of the robotic device.

During operation, a robotic device may utilize robotic radar assistance to enable operation of the robotic device while maintaining a desired distance from other objects. The desired distance may vary depending on the type of objects. For example, the robotic device may be configured to maintain a greater distance from people in the environment during operation than the distance required during operation by manufacturing materials. As such, the robotic device may operate without colliding into people, other robotic devices, and/or obstacles in the environment.

In other implementations, the desired distance that a robotic device may operate using robotic radar assistance may depend on the nature of the robotic device and the activities that the robotic device is performing. For example, a fast-traveling robotic device and/or a robotic device with many moving parts may be configured to maintain farther distances from people and/or other objects compared to a slow moving robotic device. Similarly, the size and other parameters of the robotic device may influence the desired distance that the robotic device may maintain using radar assistance.

In another example implementation, a safety computing system may assist in controlling multiple robotic devices operating in an environment. For instance, the safety computing system may control operations of numerous robotic devices operating in a manufacturing plant. During operation of the robotic devices, each radar unit of the different robotic devices may transmit object location information to the safety computing system for processing. The safety computing system may transmit control instructions to one or more robotic devices based on incoming object location information. For example, a radar unit associated with a first robotic device may detect the presence of a person located in a corner of the environment. As a result, the safety computing system may use the object location information received from the first robotic device to send instructions to all the robotic devices in the environment to avoid operating nearby the corner of the environment. The safety computing system may send other instructions to all and/or a subset of the robotic devices in other implementations.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   monitoring, at a computing system using a plurality of curved radar antennas coupled at respective positions of a robotic device, a buffer that extends proximate around one or more portions of the robotic device, wherein the plurality of curved radar antennas are configured to monitor the buffer such that the buffer has a shape that mirrors exterior shapes of the one or more portions of the robotic device;
   receiving object location information from the plurality of curved radar antennas, wherein the object location information indicates positions of respective objects within the buffer relative to the robotic device;
   identifying, based on the object location information, an unexpected object within the buffer; and
   based on identifying the unexpected object within the buffer, causing the robotic device to adjust robotic operation.

2. The method of claim 1, wherein the plurality of curved radar antennas includes at least one set of three curved radar antennas coupled around a portion of the robotic device at 120 degree increments.

3. The method of claim 2, wherein the portion of the robotic device corresponds to an arm of the robotic device.

4. The method of claim 1, wherein based on identifying the unexpected object within the buffer, causing the robotic device to adjust robotic operation comprises:
   causing the robotic device to stop moving;
   receiving, at the computing system from at least one sensor, sensor data corresponding to the unexpected object, wherein the at least one sensor differs from the plurality of curved radar antennas; and
   based on the sensor data, causing the robotic device to perform a subsequent robotic operation.

5. The method of claim 1, wherein based on identifying the unexpected object within the buffer, causing the robotic device to adjust robotic operation comprises:
   causing the robotic device to stop performing a current robotic operation.

6. The method of claim 1, wherein based on identifying the unexpected object within the buffer, causing the robotic device to adjust robotic operation comprises:
   causing the robotic device to stop operating until detecting that the unexpected object is no longer positioned in the buffer.

7. The method of claim 1, wherein the plurality of curved radar antennas includes at least a first radar antenna having a first size and a second radar antenna having a second size, wherein the first size is different than the second size.

8. The method of claim 1, wherein monitoring, using the plurality of curved radar antennas coupled at respective positions of the robotic device, the buffer that extends proximate around one or more portions of the robotic device comprises:

monitoring a first buffer that extends proximate around a body of the robotic device and a second buffer that extends proximate around an arm of the robotic device.

9. The method of claim 8, wherein the first buffer and the second buffer overlap at one or more points.

10. A robotic device, comprising:
one or more processors;
a plurality of curved radar antennas coupled at respective positions of the robotic device; and
a non-transitory computer-readable medium, configured to store instructions, that when executed by the one or more processors, cause the robotic device to perform functions comprising:
monitoring, using the plurality of curved radar antennas, a buffer that extends proximate around one or more portions of the robotic device, wherein the plurality of curved radar antennas are configured to monitor the buffer such that the buffer has a shape that mirrors exterior shapes of the one or more portions of the robotic device;
receiving object location information from the plurality of curved radar antennas, wherein the object location information indicates positions of respective objects within the buffer relative to the robotic device;
identifying, based on the object location information, an unexpected object within the buffer; and
based on identifying the unexpected object within the buffer, causing the robotic device to adjust robotic operation.

11. The robotic device of claim 10, further comprising:
identifying, using the object location information from the plurality of curved radar antennas, respective parameters of the unexpected object that indicates the unexpected object corresponds to a person, wherein the respective parameters includes a height of the unexpected object.

12. The robotic device of claim 11, wherein based on identifying the unexpected object within the buffer, causing the robotic device to adjust robotic operation comprise:
causing the robotic device to stop performing the robotic operation.

13. The robotic device of claim 10, wherein the plurality of curved radar antennas coupled at respective positions of the robotic device includes at least one radar antenna coupled to a front of a body of the robotic device, at least one radar antenna coupled to a back of the body, at least one radar antenna coupled to a left side of the body, and at least one radar antenna coupled to a right side of the body.

14. The robotic device of claim 10, further comprising:
identifying, based on the object location information, an expected object within the buffer; and
based on identifying the expected object within the buffer, causing the robotic device to adjust robotic operation based on a position of the expected object.

15. The robotic device of claim 14, wherein causing the robotic device to adjust robotic operation based on the position of the expected object comprises:
causing the robotic device to grip the expected object.

16. The robotic device of claim 10, wherein the plurality of curved radar antennas includes a set of six radar antennas coupled around a portion of the robotic device at 60 degree increments.

17. The robotic device of claim 10, wherein the object location information further includes information indicating a size and a velocity of the unexpected object.

18. The robotic device of claim 10, wherein the buffer that extends proximate around one or more portions of the robotic device corresponds to a volume of space comprising the one or more portions of the robotic device.

19. The robotic device of claim 10, wherein the buffer that extends proximate around one or more portions of the robotic device corresponds to a two-dimensional area that extends around the one or more portions of the robotic device.

20. A non-transitory computer-readable medium configured to store instructions, that when executed by one or more processors, cause a computing system to perform functions comprising:
monitoring, using a plurality of curved radar antennas coupled at respective positions of a robotic device, a buffer that extends proximate around one or more portions of the robotic device, wherein the plurality of curved radar antennas are configured to monitor the buffer such that the buffer has a shape that mirrors exterior shapes of the one or more portions of the robotic device;
receiving object location information from the plurality of curved radar antennas, wherein the object location information indicates positions of respective objects within the buffer relative to the robotic device;
identifying, based on the object location information, an unexpected object within the buffer; and
based on identifying the unexpected object within the buffer, causing the robotic device to adjust robotic operation.

* * * * *